United States Patent [19]

Head

[11] 4,449,561
[45] May 22, 1984

[54] NON-SKID DEVICE FOR WHEELCHAIRS AND THE LIKE

[76] Inventor: Randall T. Head, 2937 Butte Ave., Santa Clara, Calif. 95051

[21] Appl. No.: 477,508

[22] Filed: Mar. 21, 1983

[51] Int. Cl.³ .............................................. B60C 27/00
[52] U.S. Cl. .................... 152/213 R; 24/502; 24/523; 152/221; 152/234; 152/243; 280/289 WC; 403/344
[58] Field of Search ............... 152/208, 213 R, 213 A, 152/216, 217–219, 220–224, 225 R, 226–235, 243, 244, 174, 181, 186, 190, 187, 373; 301/41 R, 42; 280/289 R, 289 WC; 24/68 CT, 68 TT, 69 T, 69 TT, 499–511, 523; 403/344

[56] References Cited

U.S. PATENT DOCUMENTS

| | | | |
|---|---|---|---|
| 1,273,933 | 7/1918 | Schmidt | 152/234 |
| 1,286,656 | 12/1918 | Lamb | 152/235 |
| 1,294,716 | 2/1919 | Skahen | 152/235 |
| 1,393,986 | 10/1921 | Wallace et al. | 152/234 |
| 1,406,461 | 2/1922 | Kloepper | 152/234 |
| 2,955,634 | 10/1960 | Schieber et al. | 152/233 |
| 3,064,703 | 11/1962 | Schieber et al. | 152/233 |
| 3,133,582 | 5/1964 | Schieber et al. | 152/233 |
| 3,566,949 | 3/1971 | Schieber et al. | 152/237 |
| 4,222,425 | 9/1980 | Bindel | 152/233 |

Primary Examiner—Edward C. Kimlin
Assistant Examiner—Thomas Bokan
Attorney, Agent, or Firm—Robert W. Dilts

[57] ABSTRACT

A non-skid device made of side link sleeve and pin chain for the spoked wheels of wheelchairs, bicycles and the like. The chain includes a removable pin to enable assembly of the chain onto the wheel with a spoke of the wheel captured between the free ends of a pair of spaced side links thereof. A slotted plate having major surfaces of larger dimensions than the transverse dimensions of the chain is rigidly fixed to the chain with its slot extending from between the free ends of such pair of spaced side links to the adjacent edge of the plate to pass the spoke upon assembly and removal. One embodiment includes a resilient shoe member. Alternate removable pin structures are described.

15 Claims, 12 Drawing Figures

U.S. Patent    May 22, 1984    Sheet 1 of 3    4,449,561
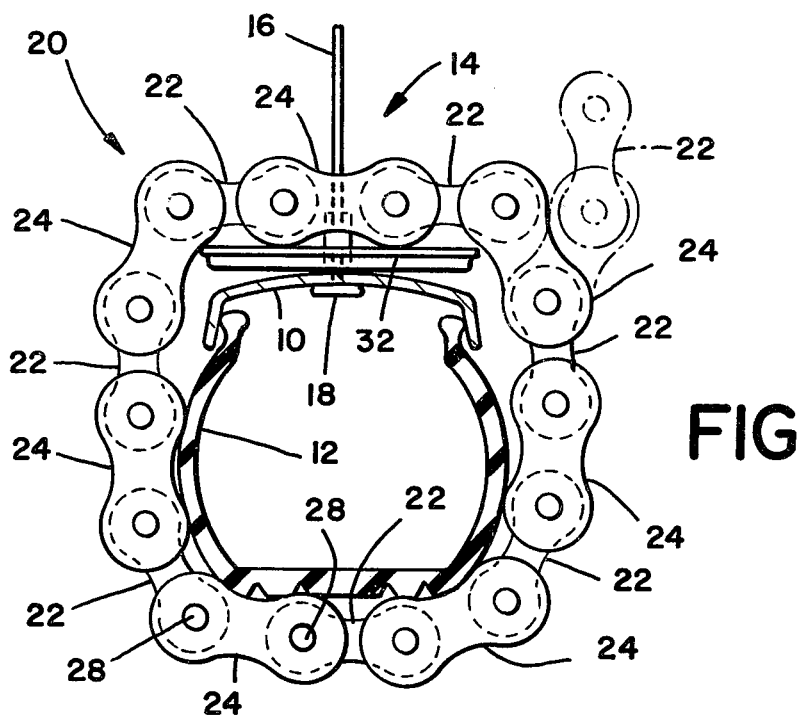
FIG _ 1
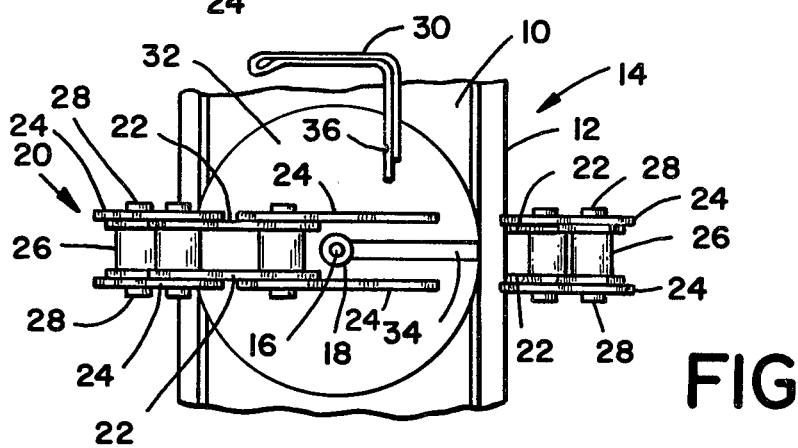
FIG _ 2
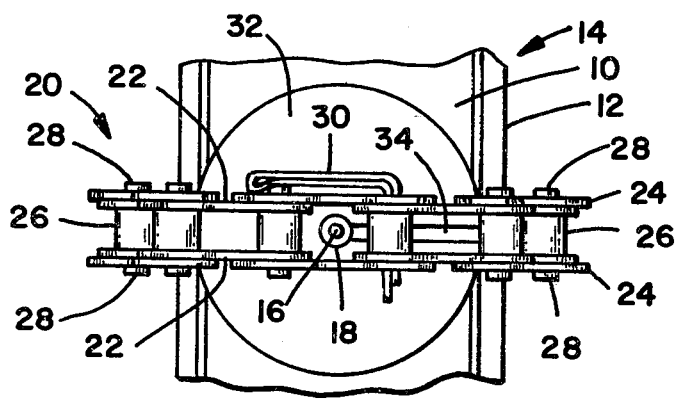
FIG _ 3

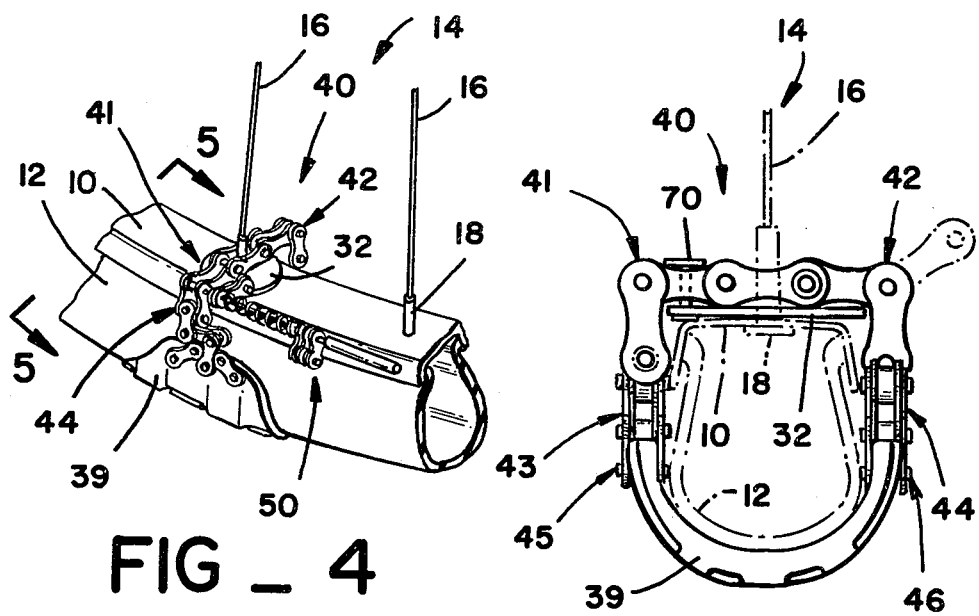
FIG_4
FIG_5
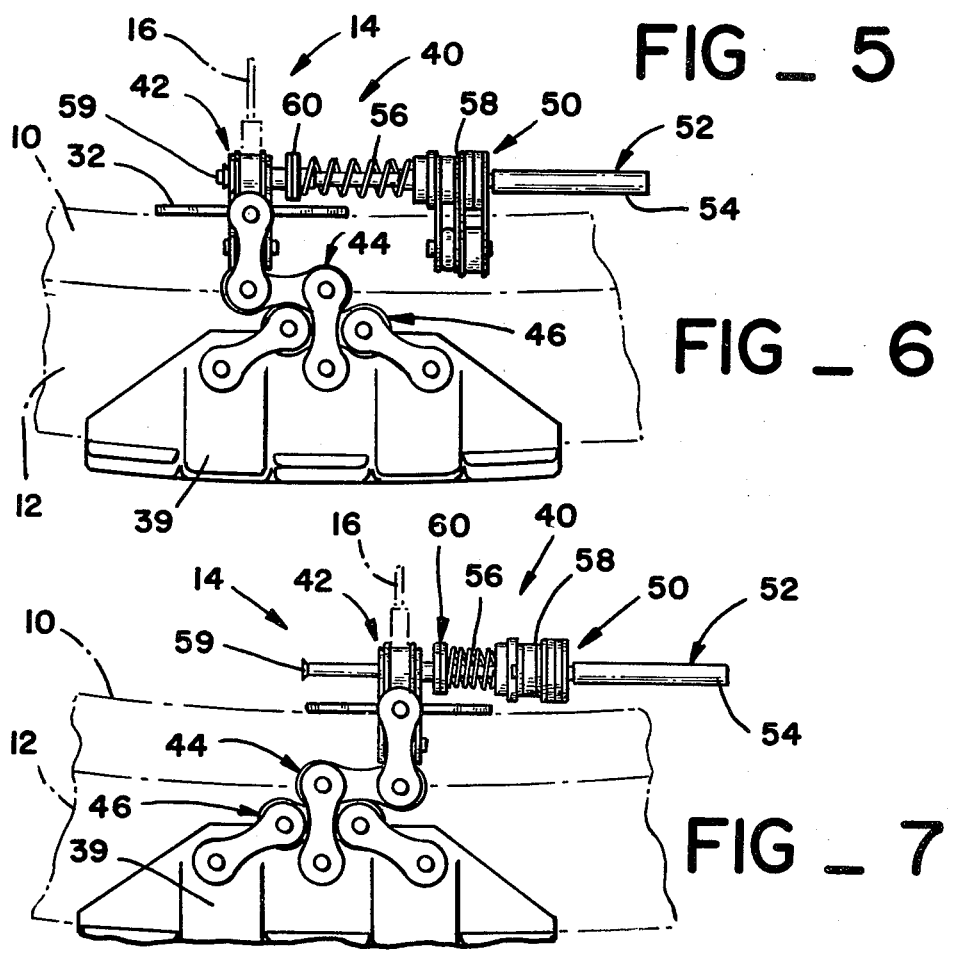
FIG_6
FIG_7

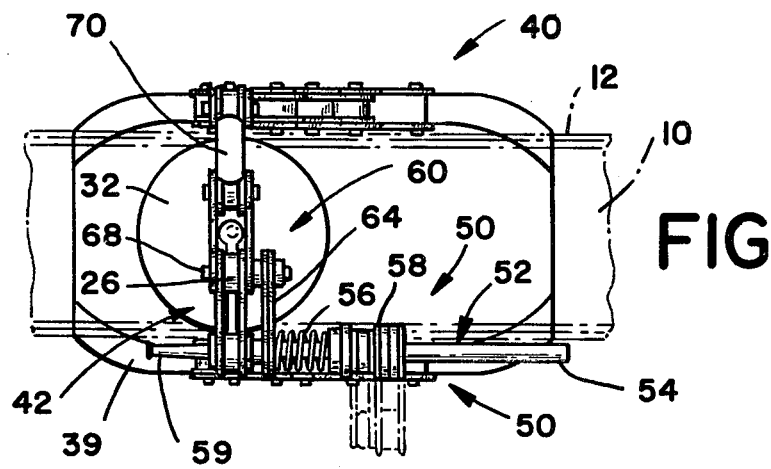
FIG_8
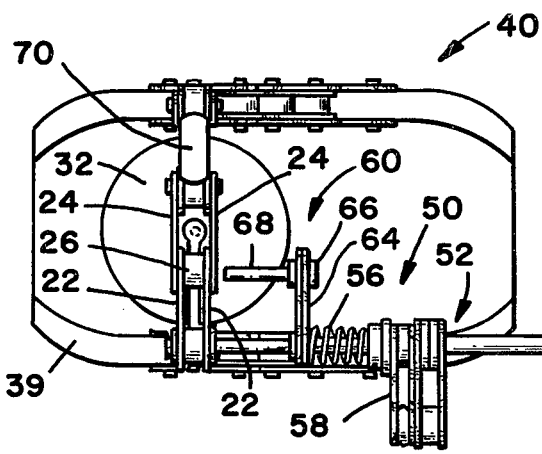
FIG_9
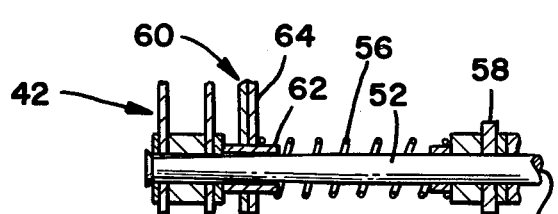
FIG_11
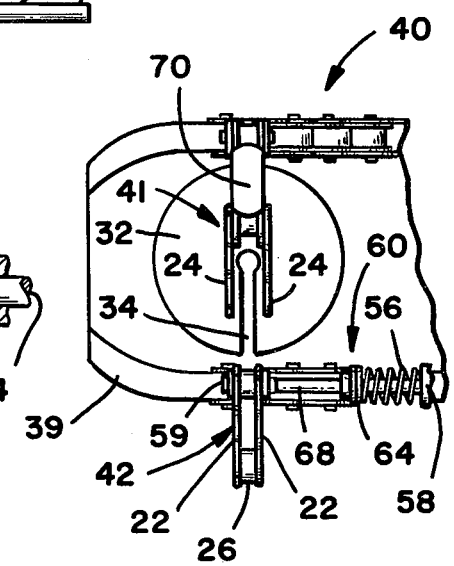
FIG_10
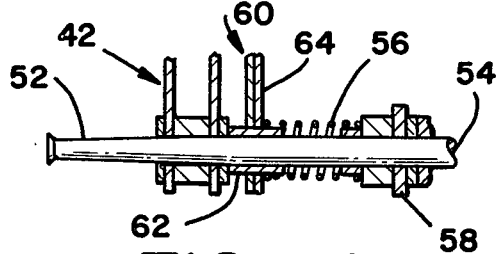
FIG_12

NON-SKID DEVICE FOR WHEELCHAIRS AND THE LIKE

FIELD OF THE INVENTION

This invention relates to wheel mounted non-skid devices and more particularly to an improved non-skid device including chain elements of the side link, sleeve and pin-type for application in multiple units to spoke-type wheels of wheelchairs and the like.

BACKGROUND OF THE INVENTION

Automobile tire chains made of two parallel lengths of interlocked loop-type links periodically interconnected by transverse lengths of interlocked loop-type links are well known in the art. The difficulty of mounting such chains on the tires and wheels of modern automobiles is equally well known in the art.

In earlier years, when spoke-type wheels were more widely employed, various anti-skid devices comprising lengths of interlocked loop-type chains adapted to be mounted in a plurality of separate units spaced about the periphery of the wheel and tire with each fixed to a different spoke were proposed. The U.S. patents to Schmidt, No. 1,273,933; Lamb, No. 1,286,656; Skoken, No. 1,294,716; Wallace et. al., No. 1,393,986 and Kloepper, No. 1,406,461 are representative of this type of device.

However, non-skid chains made of interlocked loop-type links have a tendency to roll when subjected to frictional forces transversely of their length. In addition, the links of such a chain are not only abraded by frictional contact with the tire and the surface on which the tire is running but also by frictional forces between the interlocked links thereof produced by the working of the links on each other. Thus, the anti-skid chain devices of the prior art have not provided a smooth traction effect in use and have a useful life limited by excessive wear of the weakest link thereof.

It is the object of this invention to overcome the above and other disadvantages of the anti-skid chain devices of the prior art.

SUMMARY OF THE INVENTION

The non-skid device for use on spoked wheels of a wheelchair or the like according to this invention comprises a first length of chain of side link, sleeve and pin construction terminating at one end in a pair of spaced side links, and a second length of chain of side link, sleeve and pin construction terminating at one end in a pair of side links interconnected by a sleeve and adapted to be received between the spaced side links of the first length of chain. A selectively removable pin member is provided for interconnecting the ends of the two lengths of chain. A slotted plate member having a transverse dimension greater then the transverse dimension of the first and second lengths of chain is rigidly fixed to the first length of chain with the slot of the slotted member centrally disposed and aligned between the pair of spaced side links terminating the end of the first length of chain. The slot terminates between the pair of spaced side links and opens at the free ends of the pair of spaced side links. A traction means interconnects the other ends of the first and second lengths of chain. According to one embodiment of the invention, the traction means comprises a third length of chain of side link, sleeve and pin construction identical to the first and second lengths of chain whereby the first, second and third lengths of chain form a single continuous length of side link, sleeve and pin-type chain. According to another embodiment of this invention, the traction means comprises a section cut from the tread and sidewalls of a tire to provide a shoe or boot.

BRIEF DESCRIPTION OF THE DRAWING

FIG. 1 is a fragmentary cross-sectional view taken through the felly and tire of a spoked wheel of the type used on wheelchairs, bicycles and the like showing in full a non-skid device according to one embodiment of this invention as applied to the wheel with a portion of the non-skid device shown in phantom as positioned for assembly onto the wheel.

FIG. 2 is an exploded fragmentary top plan view of FIG. 1 showing the non-skid device according to the embodiment of FIG. 1 in position for assembly onto the wheel.

FIG. 3 is a fragmentary top plan view of FIG. 1 showing the embodiment of FIG. 1 as assembled onto the wheel.

FIG. 4 is a fragmentary perspective view showing a further embodiment of the non-skid device according to this invention as applied to the spoked wheel of a wheelchair, bicycle or the like.

FIG. 5 is a fragmentary cross-sectional view of the embodiment of this invention as shown in FIG. 4 taken along line 5—5 of FIG. 4 with the wheel and tire shown in phantom and with a portion of the device shown in phantom in an intermediate assembly position.

FIG. 6 is an enlarged side view in elevation of FIG. 4 showing the device according to the embodiment of FIG. 4 as fully assembled on the wheel with the wheel shown in phantom with the positioning of the non-skid device on the wheel adapted to accommodate clockwise rotation of the wheel.

FIG. 7 is a side view in elevation similar to FIG. 6 but showing the non-skid device in position relative to the wheel to accommodate counter-clockwise rotation of the wheel and with members of the device shown in the position they would occupy during a terminal step of the assembly or removal of the non-skid device with respect to the wheel.

FIG. 8 is a top plan view of FIG. 7 but with the non-skid device otherwise in position to accommodate clockwise rotation of the wheel.

FIG. 9 is a view similar to FIG. 8 but omitting the wheel and showing the members of the device in the position they would occupy during a further step in the assembly or removal of the non-skid device with respect to the wheel.

FIG. 10 is a fragmentary view similar to FIG. 9 and showing the members of the non-skid device in the position they would occupy during yet another step in the assembly or removal of the device with respect to the wheel.

FIG. 11 is an enlarged cross-sectional view of one of the elements of the embodiment of this invention shown in FIGS. 4 through 10 with the parts thereof in the relative positions they would occupy when assembled on the wheel.

FIG. 12 is an enlarged cross-sectional view similar to FIG. 11 but showing the members in the position they would occupy during an intermediate step of the assembly or removal of the device with respect to the wheel.

DETAILED DESCRIPTION OF PREFERRED EMBODIMENTS

Referring to FIG. 1, a cross-section taken through the felly 10 and tire 12 of a spoked wheel 14 of the type used on wheelchairs and bicycles taken between the spokes thereof is shown. A peripheral fragment of a spoke 16 is shown in full together with the adjustable head 18 that mounts it to the felly 10 of the wheel 14.

Similarly, an embodiment 20 of this invention is shown in full in its fully mounted position on the wheel 14. The embodiment 20 comprises a length of side link sleeve and pin chain substantially equal to the combined cross-sectional circumference of the felly 10 and inflated tire 12. The chain of embodiment 20 may be conventional bicycle drive chain comprising pairs of spaced inner side links 22 interconnected with each other by means of pairs of spaced outer side links 24.

Each inner side link 22 is apertured at its opposite ends and the pairs of inner side links 22 are interconnected with each other by means of a pair of sleeves 26, each communicating with the apertures at opposite ends of the inner side links 22. The outer side links 24 are also apertured at their opposite ends and each pair of outer side links 24 is interconnected with adjacent pairs of inner side links 22 by means of a pair of pins 28 each received through the apertures at one end of the outer side links 24 and through the apertures and sleeve 26 at one end of a pair of inner side links 22 as in a conventional bicycle drive chain which may also include a roller bearing (not shown in the drawing) about the sleeve 26.

According to this invention, a removable pin 30 which may take the form of a cotter key as best shown in FIGS. 2 and 3 of the drawing, is provided for interconnecting the free ends of the chain formed of the inner 22 and outer 24 side links, as described hereinabove. Thus, as best shown in FIGS. 2 and 3, one of the free ends of the chain terminates in a pair of outer side links 24 and the other free end of the chain terminates in a pair of inner side links 22 interconnected by a sleeve 26. Also, according to this invention, a slotted plate 32 is rigidly fixed to the free end of the chain of embodiment 20 which terminates in a pair of outer links 24, as best shown in FIG. 2. The plate 32 may be welded, brazed or otherwise permanently affixed to the chain of embodiment 20.

The slot 34 in the slotted disc 32 extends from one edge thereof to a point centrally disposed between the outer side links 24 which terminate the chain of embodiment 20. As best shown in FIG. 2, the slot 34 extends parallel to the outer side links 24 and is dimensioned to receive the spokes 16. The slot 34 terminates in an opening dimensioned to receive the shank of the adjustable spoke head 18. Thus, as best shown in FIG. 2, the slotted plate 32 is assembled on a spoke 16 of the wheel 14 so that the spoke 16 is received between the outer side links 24. The plate 32 is placed in contact with the felly 10 of the wheel 14 so that the shank of the adjustable spoke head 18 is received therein. The chain of the embodiment 20 is then wrapped around the tire 12 and the inner side links 22 at the other free end thereof are inserted between the outer side links 24 which are affixed to the plate 32. Removable pin 30 or cotter key is then inserted through the aligned apertures of the side links 22 and 24 including the sleeve 26 to form a completed assembly as best shown in FIG. 3. The pin 30 may be provided with an appropriate detent 36 to hold it in assembled position.

It will be understood that a plurality of non-skid devices according to the embodiment 20 would be assembled in spaced array about the periphery of the wheel of a wheelchair, bicycle, or the like, with each being associated with a different spoke of the wheel. In use, each of the non-skid devices according to the embodiment 20 would be brought into contact with the surface on which the wheel is running by rotation of the wheel to provide increased traction. The plate 32 and the side links, sleeve and pin construction of the embodiment 20 will prevent it from rolling. In addition, the side links of the chain will provide extended life in use. The side link, sleeve and pin construction of the chain will reduce the abrading action of the elements of the chain on each other.

Referring to FIG. 4, another embodiment of this invention 40 which may be preferred in certain instances, is shown in perspective as applied about the felly 10 and tire 12 of the wheel 14 of a wheelchair, bicycle or the like at one of the spokes 16 thereof. According to the embodiment 40, the portion of the side link, sleeve and pin chain intermediate its ends is replaced by a shoe 39 of resilient material, such as rubber or the like. For example, referring to FIG. 6, the shoe 39 may comprise a section cut from the tread and sidewalls of a tire of a larger size than the tire 12. The embodiment 40 of this invention has the advantage that it will not scratch or mar the surface upon which the wheel 14 is running. Thus, the embodiment 20 of this invention is particularly suited for outside even on wet or icy pavements or mud and snow. The embodiment 40 is particularly useful for indoor use on floors that are slippery due to waxing, for example, but will also provide a "snow tire" effect in outdoor use.

In the embodiment 40 of this invention as actually built and shown in FIGS. 4 through 10 of the drawing, conventional bicycle drive chain is used. Thus, the embodiment 40 comprises a first length 41 of such chain, including one pair of inner side links and two pairs of outer side links and a second length 42 of such chain including one pair of inner side links and one pair of outer side links. The pair of inner side links of the first length 41 of chain is rigidly fixed to a slotted plate 32 with one pair of outer side links appropriately aligned with the slot 34 in plate 32, as described hereinabove in connection with the embodiment 20. Thus, the pair of inner side links of the second length 42 of chain may be placed over the slot 34 in the plate 32 and received between the pair of outer side links of the first length 41 of chain so that it may be affixed thereto by means of a removable pin, as will be more fully described hereinafter.

The embodiment 40 of this invention also comprises a third length 43 and a fourth length 44 of such chain. The third and fourth lengths of chain 43 and 44 are identical to each other and each includes one pair of inner side links and two pairs of outer side links. The third length 43 of drive chain is rotated 90° with respect to the first length 41 and affixed thereto by means of two pins 28, one of which is received through the pair of outer side links at the end of the first length 41 of chain and the other of which is received through the pair of outer side links at the end of the third length 43 of chain. Similarly, the fourth length 44 of chain is rotated 90° with respect to the second length 42 of chain and affixed thereto by means of a pair of pins 28, one of which is received through the outer side links at the end of the second length 42 of chain and the other of which is received through the outer side links at one end of the fourth length 44 of chain.

The other ends of the third length 43 and fourth length 44 of chain are affixed to the shoe 39. Thus, the sidewalls of the shoe 39 are received between the pairs of outer side links at such other ends of the third and fourth lengths of chain 43 and 44 and affixed thereto by means of pins 28 received through such outer side links and the sidewalls of the shoe 39.

Referring to FIGS. 6 and 7, the above described construction of the embodiment 40 of this invention provides for a substantial tolerance between the circumferential dimensions of the felly 10 and tire 12 of the wheel 14 and the circumferential dimensions of the embodiment 40. In other words, the embodiment 40 may be made somewhat oversize in order to facilitate its installation on the wheel 14 without loss of traction or the introduction of slippage in the operation thereof.

Thus, referring to FIG. 6, the shoe 39 and the third and fourth lengths of chain 43 and 44 will be placed in the position shown with respect to the felly 10 and tire 12 when the wheel 14 is to be driven in a clockwise direction. The elements of the device 40 will tend to retain their relative positions with respect to the felly 10 and tire 12 of the wheel 14 once it is in the position shown in FIG. 6 in spite of circumferential forces of which it may be subjected in use due to the mechanical characteristics of the lengths of chain 43 and 44.

In other words, the interconnection between the shoe 39 and the lengths of chain 43 and 44 may be fairly ridig. Similarly, the interconnection between the lengths of chain 43 and 44 with the length of chain 41 and 42, respectively, is rigid. Thus, rotational movement is only permitted at the ends of the pair of inner side links of the lengths of chain 43 and 44. In order for the shoe 39 to move circumferentially along the outer periphery of the tire 12, it must first move radially away from the tire 12 and felly 10. Such movement cannot occur when the shoe 39 is in contact with the surface upon which the wheel 14 is running without raising the entire weight of the vehicle and user. The shoe 39 is relatively light and the lever arm provided by the pair of inner side lengths is relatively small so that inertial forces in use are unlikely to be sufficient to overcome the frictional forces present in the rotational axes at the opposite ends of the pair of inner side lengths. In FIG. 7, the elements of the device 40 are shown in their position specifically adapted for counterclockwise rotation of the wheel 14. However, under most circumstances, the elements of the device 40 would remain in this position even if the wheel were rotated in a clockwise direction for the reasons set forth above. In order to enhance the above action and provide for a more secure interconnection of the shoe 39 with the remainder of the device, the embodiment 40 preferably includes a fifth length of chain 45 and a sixth length of chain 46.

The lengths of chain 45 and 46 are identical and each includes a pair of inner side links and two pairs of outer side links interconnected by a pair of pins 28. The lengths of chain 45 and 46 are arranged along the upper edge of the opposite sidewalls, respectively, of the shoe 39 with such sidewalls received between the two pairs of outer links at the opposite ends of each length of chain 45 and 46. The opposite ends of the lengths of chain 45 and 46 may be rigidly fixed to the shoe 39 by means of pins passing through the outer side links and the intervening sidewalls of the shoe. The pair of inner side links of each length of chain 45 and 46 is received between the pair of outer side links at the ends of the lengths of chain 43 and 44, respectively, together with the sidewalls of the shoe 39. Thus, the outer side links at the ends of the lengths of chain 43 and 44 are trapped between the outer side links of the lengths of chain 45 and 46, thereby providing abutment surfaces against which forces may be exerted in use.

The embodiment 40 of this invention preferably includes a spring-loaded removable pin means 50 to facilitate the installation of the device 40 on a wheel 14 and its subsequent removal from the wheel 14. Such removable pin device comprises an elongated control rod 52 adapted to replace a pin 28 in interconnecting the pair of inside links and pair of outside links which make up the second length of chain 42. One end of the control rod 52 is provided with a finger grip 54. A helical compression spring 56 surrounds an intermediate portion of the control rod 52 and is captured between a thumb lever 58, which is rigidly fixed to the control rod 52 adjacent the finger grip 54 and the length of chain 42. The other end of the control rod is swaged as indicated at 59 to prevent it from being drawn through the apertures and sleeve at the interconnection of the inner and outer links of the length of chain 42. In normal operation, the swaged end of the control rod 52 is maintained in abutment with the length of chain 42 by the force of the compression spring 56, as shown in FIG. 6.

As best shown in FIGS. 8 and 9, a pin yoke 60 is interposed between the compression spring 56 and the length of chain 42. The pin yoke 60 comprises a bridging member 64 carrying an elongated connecting pin 68 in spaced parallel relation to the control rod 52. The bridging member 64 may comprise an outer side link 24 with oversize apertures at the ends thereof and in the embodiment shown in the drawing, comprises two outer side links 24 in side-to-side abutting relation with their oversize apertures in alignment. A wedging collar 62 is rigidly mounted in the oversize aperture at one end of the bridging member 64 with the control rod 52 received therethrough with a sliding fit. A mounting collar 66 rigidly fixed in the oversize aperture at the other end of the bridging member 64 carries the elongated connecting pin 68 parallel to the control rod 52 and extending toward the swaged end 59 of the control rod 52. The connecting pin 68 is identical to the connecting pins 28 in cross-sectional dimensions and is adapted to be inserted through the apertures in the inner and outer side links 22, 24 and sleeve 26 therebetween.

Referring to FIGS. 11 and 12, the intermediate portion of the control rod 52 which is surrounded by the compression spring 56 is tapered from a smaller diameter adjacent the wedging collar 62 to a larger diameter adjacent the thumb lever 58. Thus, when the control rod 52 is moved axially from its position shown in FIGS. 6 and 11, to the position shown in FIGS. 7, 8 and 12, the tapered intermediate portion of the control rod 52 will be brought into contact with the wedging collar 62. If the control rod is rotated about its axis by forces exerted on the finger grip 54 and thumb lever 58 thereof, it will tend to wedge in the wedging collar 62. Subsequent movement of the control rod 52 in the opposite direction from the position shown in FIGS. 7, 8 and 12 to the position shown in FIG. 9 will carry the bridging member 64 and connecting pin 68 of the pin yoke 60 with it to their positions shown in FIG. 9. As shown in FIG. 9, the connecting pin 68 is withdrawn from the sleeve 26 and apertures of the side links 22 and 24. The compression spring 56 will be held in a compressed condition between the pin yoke 60 and the thumb lever 58.

Referring to FIG. 10, the sleeve 26 and pair of inner side links 22 of the length of chain 42 may now be rotated about the control rod 52 to remove them from between the outer side links 24 of the length of chain 41. Similarly, the control rod 52 may be rotated about its axis to move the pin yoke 60 outwardly of the wheel 14. When the elements of the device 40 are in this position, the slot 34 of the plate 32 is unobstructed so that the device 40 may be removed from the spoke 16 and wheel 14. In order to apply the device 40 to a wheel 14, the above sequence is reversed and the control rod rotated about its axis by forces exerted on the finger grip 54 or thumb lever 58 with a slight axial pull to release the wedging action between the control rod 52 and the wedging collar 62.

The removable pin means 50 of FIGS. 4 through 10 could, of course, be used on the embodiment of this invention shown in FIGS. 1 through 3. Similarly, the removable pin 30 or cotter key shown in FIGS. 1 through 3 could be used in place of the removable pin means 50 of the embodiment 40 shown in FIGS. 4 through 10. As shown in FIGS. 5, 8, 9 and 10, the first length 41 of chain may be fixed to the slotted plate 32 by means of a rivet 70 passing through the pair of inside links 22 thereof instead of welding or brazing it to the plate 32 as discussed in connection with FIGS. 1 through 3. Thus, although the slotted plate 32 and side link chain elements are essential features of embodiments of the simple and inexpensive device made of readily available parts according to the teaching of this invention, obvious modifications in the assembly of such parts may be made by those skilled in the art without departing from the scope of the following claims.

What is claimed is:

1. A non-skid chain device for the spoked wheels of wheelchairs, bicycles and the like having a felly and tire of given cross-sectional circumference, said device comprising a length of side link, sleeve and pin-type chain sufficient to surround said given cross-sectional circumference of said felly and tire, with one end of said length of chain terminating in the free ends of a pair of spaced side links and the other end of said length of chain terminating in a pair of side links interconnected by a sleeve adapted to be received between said free ends of said spaced side links of said one end of said length of chain; a slotted plate member having transverse dimensions greater than the transverse dimensions of said length of chain rigidly fixed to said one end of said length of chain with the slot of said slotted plate member dimensioned to receive a spoke of said spoked wheels centrally disposed and aligned between said spaced side links of said one end of said length of chain, said slot terminating between said spaced side links centrally thereof and opening at said free ends of said spaced side links; and a removable pin for selectively interconnecting the ends of said length of chain.

2. A non-skid device for use on spoked wheels of wheelchairs, bicycles and the like having a felly and tire of given cross-sectional circumference, said device comprising a first length of chain of side link, sleeve and pin construction terminating at one end in the free ends of a pair of spaced side links; a second length of chain of side link, sleeve and pin construction terminating at one end in a pair of side links interconnected by a sleeve and adapted to be received between said free ends of said spaced side links terminating said one end of said first length of chain; a selectively removable pin member adapted to interconnect said pair of spaced side links terminating said one end of said first length of chain with said pair of side links and sleeve terminating said one end of said second length of chain; a slotted plate member having a transverse dimension greater than the transverse dimension of said first and second lengths of chain rigidly fixed to said first length of chain with the slot of said slotted plate member dimensioned to receive a spoke of said spoked wheels and centrally disposed and aligned between said pair of spaced side links terminating said one end of said first length of chain, said slot terminating centrally between said pair of spaced side links and opening at said free ends of said pair of spaced side links terminating said one end of said first length of chain; and traction means interconnecting the other ends of said first and second lengths of chain dimensioned to provide a combined length sufficient to surround said given cross-sectional circumference of said felly and tire.

3. A non-skid device as claimed in claim 2 wherein said traction means comprises a third length of chain of side link, sleeve and pin construction identical to said first and second lengths of chain whereby said first, second and third lengths of chain form a single continuous length of said side link, sleeve and pin chain.

4. A non-skid device as claimed in claim 2 wherein said traction means comprises a shoe of resilient material having a substantially semi-circular cross-section with the concave surface thereof dimensioned to receive the periphery of said spoked wheels.

5. A non-skid device as claimed in claim 4 wherein said shoe comprises a section of the tread and sidewalls of a pneumatic tire.

6. A non-skid device for use on spoked wheels of wheelchairs, bicycles and the like having a felly and tire of given cross-sectional circumference, said device being dimensioned to surround said given cross-sectional circumference of said felly and tire and comprising:

a first length of given size side link, sleeve and pin chain consisting of two pairs of spaced outer side links, one pair of inner side links interconnected by a pair of sleeves at opposite ends thereof and a pair of pins each interconnecting a different one of said two pairs of outer side links with a different end and sleeve of said pair of inner side links;

a slotted plate member rigidly fixed to said pair of inner side links of said first length of chain on one side thereof, said slotted plate member having major surfaces of larger transverse dimensions than the transverse dimension of said first length of chain and longitudinal dimensions extending from one end of said pair of inner side links of said first length of chain to a point beyond the other end thereof, said slot of said slotted member extending longitudinally of said plate member from a point centrally located between the one of said two pairs of spaced outer side links which is interconnected with said other end of said pair of inner side links of said first length of chain to the edge of said plate and being dimensioned to receive a spoke of said spoked wheels;

a second length of said given size side link, sleeve and pin chain consisting of one pair of spaced outer links, one pair of inner side links interconnected by a pair of sleeves at opposite ends thereof and a pin interconnecting said pair of spaced outer side links with one end and sleeve of said pair of inner side links;

a traction means interconnecting the one of said pairs of outer side links at said one end of said pair of inner side links of said first length of chain with said pair of outer side links of said second length of chain; and a removable pin for interconnecting said one of said two pairs of outer side links at said other end of said pair of inner side links of said first length of chain with the other end of said pair of inner side links of said second length of chain.

7. A non-skid device as claimed in claim 6 wherein said traction means comprises:

third and fourth lengths of said given size side link, sleeve and pin chain each consisting of two pairs of spaced outer side links, one pair of inner side links interconnected by a pair of sleeves at opposite ends thereof and a pair of pins each interconnecting a different one of said two pairs of outer side links with a different end and sleeve of said pair of inner side links;

the pair of outer side links at one end of said third length of chain being interconnected with the one of said pairs of outer side links at said one end of said pair of inner side links of said first length of chain with said side links of said third length of chain rotated ninety degrees with respect to said side links of said first length of chain;

the pair of outer side links at one end of said fourth length of chain being interconnected with said pair of outer side links of said second length of chain with said side links of said fourth length of chain rotated ninety degrees with respect to said side links of said second length of chain; and a shoe of resilient material interconnecting said third length of chain with said fourth length of chain.

8. A non-skid device as claimed in claim 7 wherein said shoe of said traction means comprises a section of the tread and sidewalls of a pneumatic tire with one sidewall thereof fixedly received between the pair of outer side links at the other end of said third length of chain and the other side wall thereof fixedly received between the pair of outer side links at the other end of said fourth length of chain.

9. A non-skid device as claimed in claim 8 wherein said traction means further includes fifth and sixth lengths of said given size side link, sleeve and pin chain each consisting of two pairs of spaced outer side links, one pair of inner side links interconnected by a pair of sleeves at opposite ends thereof and a pair of pins each interconnecting a different one of said two pairs of outer side links with a different end and sleeve of said pair of inner side links; said fifth length of chain extending along said one sidewall of said shoe with the pair of inner side links thereof received together with said one sidewall between the pair of outer side links at the other end of said third length of chain; said sixth length of chain extending along said other sidewall of said shoe with the pair of inner side links thereof received together with said other sidewall between the pair of outer side links at the other end of said fourth length of chain; the ends of said fifth and sixth lengths of chain being fixed to the respective sidewall of said shoe associated therewith.

10. A non-skid device as claimed in claim 9 wherein said pair of outer side links at said one end of said third length of chain overlap said one of said pair of outer side links at said one end of said pair of inner side links of said first length of chain on opposite sides thereof with a pin fixed through said pair of outer side links at said one end of said third length of chain and between said pair of outer side links at said one end of said pair of inner side links of said first length of chain and with a pin fixed through said one of said pairs of outer side links at said one end of said pair of inner side links of said first length of chain and between said pair of outer side links at said one end of said third length of chain and wherein said pair of outer side links at said one end of said fourth length of chain overlap said pair of outer side links of said second length of chain on opposite sides thereof with a pin fixed through said pair of outer side links at said one end of said fourth length of chain and between said pair of outer side links of said second length of chain and a pin fixed through said pair of outer side links of said second length of chain and between said pair of outer side links at said one end of said fourth length of chain.

11. A non-skid device as claimed in claim 2 wherein said selectively removable pin member comprises a generally L-shaped member having one leg thereof bifurcated and dimensioned to be received in compressed condition within a sleeve of said side link, sleeve and pin chain.

12. A non-skid device as claimed in claim 11 wherein said one leg of said generally L-shaped member is provided with detent means at the opposite end thereof from said other leg of said generally L-shaped member.

13. A non-skid device as claimed in claim 2 wherein said selectively removable pin means includes a yoke member carried by a control rod, said control rod interconnecting said pair of side links terminating said second length of chain with the remainder of said second length of chain and including a swaged end and a tapered intermediate portion adapted to wedge in said yoke member for disengagement of said removable pin means.

14. A non-skid device as claimed in claim 6 wherein said pin interconnecting said pair of outer side links with one end and sleeve of said pair of inner side links of said second length of chain comprises:

an elongated control rod having one end portion adapted to be received in said sleeve with a sliding fit, an intermediate portion tapering from the diameter of said one end portion to a diameter larger than the diameter of said sleeve and a grip means at the other end thereof, said one end portion having a length more than twice the length of said sleeve and being received in said sleeve with the free end thereof swaged to a larger diameter than the diameter of said sleeve; and a yoke member having an aperture therethrough receiving said one end portion of said control rod with a sliding fit, said aperture having a diameter smaller than said larger diameter of said tapered intermediate portion of said control rod and being mounted on said control rod between said intermediate portion thereof and said second length of chain;

said removable pin being mounted on said yoke member parallel to said control rod and extending toward said swaged end of said control rod, said removable pin being spaced from said control rod by a distance equal to the spacing between said sleeves at said opposite ends of said inner side link of said second length of chain.

15. A non-skid device as claimed in claim 14 wherein: a compression spring surrounds said intermediate portion of said control rod and is captured between said yoke member and said grip means at said other end of said control rod.

* * * * *